United States Patent [19]

Ikeda et al.

[11] Patent Number: 5,438,087
[45] Date of Patent: Aug. 1, 1995

[54] PAPER SIZING COMPOSITION

[75] Inventors: Tsuyoshi Ikeda; Kiyoshi Iwai; Koji Ohta; Satoshi Hyuga; Masatoshi Hotta, all of Ichihara, Japan

[73] Assignee: Japan PMC Corporation, Tokyo, Japan

[21] Appl. No.: 79,454

[22] Filed: Jun. 21, 1993

Related U.S. Application Data

[63] Continuation of Ser. No. 632,540, Dec. 24, 1990, abandoned.

[30] Foreign Application Priority Data

Dec. 28, 1989 [JP] Japan ................... 1-338363
Jul. 6, 1990 [JP] Japan ................... 2-177534

[51] Int. Cl.$^6$ .............................. C08L 93/04
[52] U.S. Cl. ................... 524/272; 524/548; 524/555
[58] Field of Search .......... 524/272, 548, 555

[56] References Cited

U.S. PATENT DOCUMENTS 3,966,654 6/1976 Aldrich ................ 162/164
4,943,608 7/1990 Takahashi et al. .......... 524/272

FOREIGN PATENT DOCUMENTS 58-34509 3/1983 Japan.
63-120198 5/1988 Japan.
2141751 1/1985 United Kingdom.
2159183 11/1985 United Kingdom.

OTHER PUBLICATIONS

TAPPI Papermakers Conference, 1988, pp. 181–188.

Primary Examiner—Judy M. Reddick
Attorney, Agent, or Firm—Stevens, Davis, Miller & Mosher

[57] ABSTRACT

The present invention provides a paper sizing composition comprising a rosin material and cationic acrylamide and/or methacrylamide polymers having hydrophobic groups wherein said rosin material is directly emulsified in water with said polymers. The sizing composition has an improved storage stability and exhibits an excellent sizing performance in the acidic through neutral pH range.

9 Claims, No Drawings

PAPER SIZING COMPOSITION

This application is a continuation of application Ser. No. 07/632,540 filed Dec. 24, 1990, now abandoned.

FIELD OF THE INVENTION

This invention relates to a paper sizing composition comprising a rosin material and cationic acrylamide and/or methacrylamide polymers (hereinafter referred to as "cationic poly(meth) acrylamides") having hydrophobic groups wherein said rosin material is emulsified directly in water with the aid of said polymer(s). This invention also relates to a paper sizing method using said paper sizing composition.

BACKGROUND OF THE INVENTION

In the papermaking industry, it is required to carry out the papermaking in a closed system and achieve the recycling of waste paper and broke which contain calcium carbonate as well as to improve the quality of paper product. For satisfying these requirements, papermaking in the neutral pH range has been more commonly conducted with a less amount of crude alum used. With a reduced amount of crude alum and at a higher pH, however, the sizing effect of the conventional anionic rosin sizing agent is significantly degraded, especially in the presence of calcium carbonate. In order to compensate for the degradation of the sizing effect, a large amount of crude alum must be added, which may deteriorate the quality of the product and the problems involved in the operation and cost of papermaking remain unsolved.

Alkylketene dimers and alkenylsuccinic anhydrides are known as sizing agents useful in the neutral pH range. However, they are inferior to rosin sizing agents in sizing performance for high yield pulps such as mechanical pulp. Furthermore, the sizing effect of alkylketene dimers for paper just off-the-machine is not on a satisfactory level and picking-up control cannot be smoothly carried out in the size press, while alkenylsuccinic anhydrides cause an operational problem: contamination of the press roll and the dryer canvas.

Under the above-mentioned circumstances, rosin sizing agents which exhibit improved stability and excellent sizing effect in the neutral pH range are strongly needed.

Cationic rosin emulsion sizing agents have recently drawn attention as such sizing agents which may satisfy the requirements. It has been shown that they fix onto the pulp fibers by themselves and accordingly satisfactory sizing can be attained with a reduced amount of crude alum. It has also been shown that they exhibit an excellent sizing effect in the neutral pH range (TAPPI Papermakers Conference 1988 pp. 181-188). However, commercial scale production of a cationic rosin emulsion involves more difficulties in comparison with that of conventional anionic rosin emulsion. Furthermore, they are still to be improved in storage stability and performance of the product.

Methods for preparing a cationic rosin emulsion have been proposed, which are generally classified in two types. One method comprises emulsifying a water-insoluble rosin material by using some cationic emulsifying agent(s) and the other comprises mixing an anionic rosin emulsion with some cationic compound(s) to convert the emulsion into a cationic emulsion.

The former method is typically described in Japanese Patent Publication No. 58-34509 (corresponding to U.S. Pat. No. 3,966,654) and Japanese Laid open Patent Publication No. 63-120198 (corresponding to U.S. Pat. No. 4,943,608). Japanese Patent Publication No. 58-34509 discloses a method in which a fortified rosin is emulsified and dispersed by a homogenizer or the like with the aid of a water-soluble cationic resin dispersant such as polyaminopolyamide-epichlorohydrin resin, alkylenepolyamine-epichlorohydrin resin and poly(diallyamine)-epichlorohydrin resin. However, since these cationic resins do not have sufficient ability to emulsify and disperse rosin materials, the storage stability of the product is not satisfactory. Furthermore, since a significantly large amount of the cationic resin must be used in the emulsion, the cost of the product becomes high. High resin content also causes foaming in the papermaking system. Japanese Laid-open Patent Publication No. 63-120198 discloses a method for preparing a paper sizing composition by using a quaternary copolymer of a specific hydrophobic monomer and a specific cationic monomer for dispersing a fortified rosin (the hydrophobic monomer is (meth)acrylalkylester and/or a styrene compound and the cationic monomer is alkyl- aminoalkylester of (meth)acrylic acid or alkylaminoalkylamide of (meth)acrylic acid). However, this method involves problems in that, for instance, a large amount of the dispersant is needed in order to provide the product with good storage stability, which makes the emulsion inferior in foaming property and sizing performance.

The latter method is typically described in GB Patent Nos. 2141751A and 2159183A in which the use of a "one shot" sizing composition is disclosed. According to this method, a cationic emulsion is prepared by mixing a conventional anionic rosin emulsion with an organic polymer electrolyte, preferably polydi(loweralkyl)diallyl ammonium chloride, or an inorganic cationic polymer, preferably polyaluminum chloride, by means of a high-speed mixer. The thus prepared emulsion is essentially a very unstable disperse system comprising aggregated particles of wide-ranging particle size as is clear from the statement: "The mixture of rosin emulsion and the cationic compound forms aggregates gates at first and on further mixing the mixture changes into a disperse system which is stable for a few weeks. It can be redispersed by mixing even when some separation is observed."

As pointed out above, conventional cationic rosin emulsion sizing agents are inferior in storage stability and sizing performance especially in the neutral pH range. Improvements have been desired.

Thus the object of the present invention is to provide a paper sizing composition which has improved storage stability and exhibits an excellent sizing performance in neutral papermaking and that can be easily prepared on a commercial scale and also a sizing method using said paper sizing composition.

SUMMARY OF THE INVENTION

We have conducted an extensive study in search of a solution to the above-mentioned problems and found that a composition prepared by emulsifying rosin materials directly in water with the aid of a cationic poly(meth)acrylamide having hydrophobic groups has improved storage stability and exhibits an excellent sizing performance in papermaking at or around neutral pH.

Accordingly, this invention provides a paper sizing emulsion composition which comprises (A) at least one rosin material and (B) a cationic poly(meth)acrylamide having hydrophobic groups, wherein said rosin material is directly dispersed in water and stabilized with said poly(meth)acrylamide having hydrophobic groups. Preferably, particles of the emulsion have positive zeta potential at a pH of 4–8 and accumulative median value in the particle size distribution based on weight of not more than 1 μm.

It is preferred that the component (B) should be a polymer prepared from monomers in the following content:

(b-1) cationic monomer 2–30, mol %
(b-2) anionic monomer not more than 5 mol %
(b-3) hydrophobic monomer 3–50 mol %
(b-4) acrylamide and/or methacrylamide 15–95 mol % wherein (b-2) content is preferably 0 mol % and, more preferably, (b-4) content is 41–95 mol %. The preferred content of the component (B) is 0.5–20 % by weight based on the total solids and the preferred content of the total solids is 20–60 % by weight based on the whole composition.

The present invention also provides a sizing method using the above-mentioned sizing composition.

The present invention will now be more clearly described in the following description.

Paper and paperboard making is ordinary effected in the range of pH 4–8. Pulp fibers are negatively charged in water in this pH range and accordingly the sizing compound should have positive charge so as to spontaneously attach to the pulp fiber.

We conducted extensive studies in search of a rosin sizing composition which is positively charged in the range of pH 4–8 and found that an aqueous rosin emulsion which contains cationic poly(meth)acrylamide having hydrophobic groups as dispersant has positive zeta potential in the above-mentioned pH range and that said cationic poly(meth)acrylamide exhibits an excellent sizing performance and has a good storage stability. A cationic rosin emulsion paper sizing composition which contains a water-soluble cationic resin such as polyaminopolyamide-epichlorohydrin resin as dispersant is disclosed in Japanese Laid-open Patent Publication No. 50-36703 and a rosin emulsion sizing agent which contains a modified polyacrylamide resin having no hydrophobic groups is known (see Japanese Laid-open Patent Publication No. 56-169898). However, such prior art publications do not mention a rosin emulsion paper sizing composition in which cationic poly(meth)acrylamide having hydrophobic groups is contained as dispersant.

DESCRIPTION OF THE PREFERRED EMBODIMENT

The rosin material useful for the present invention includes any rosin material or rosin derivative. A preferred rosin material is the product of an addition reaction of at least one rosin material and an acidic compound containing a —C=C—C=O— group wherein said acidic material is employed in the amount of 1–20 preferably 3–15%, by weight based on the rosin. This modification reaction is effected for the purpose of improving the sizing performance and the emulsifiability of the rosin material. Typical rosin materials useful for preparing the above-mentioned rosin material are gum rosin, tall oil rosin and wood rosin. These rosins can be used alone or in combination of two or more and may be hydrogenated, polymerized or further modified with formaldehyde and the like. Typical examples of the above-mentioned acidic compound are fumaric acid, maleic acid, maleic anhydride, itaconic acid, itaconic anhydride, citraconic acid, citraconic anhydride, acrylic acid and methacrylic acid.

The preferred cationic poly(meth)acrylamide having hydrophobic groups usable in the present invention is a polymer prepared from the monomers in the following content ratios:

(b-1) cationic monomer 2–30 mol %
(b-2) anionic monomer not more than 5 mol %
(b-3) hydrophobic monomer 3–50 mol %
(b-4) acrylamide and/or methacrylamide 15–95 mol % or from the above-mentioned monomers wherein (b-2) content is 0 mol %. More preferably, the polymer contains 41–95 mol % of component (b-4).

When the polymer component (B) is prepared from monomers in the composition different from the above specified composition, the emulsifying performance thereof or the storage stability of the paper sizing composition obtained by using the same will be inferior.

The (b-1) cationic monomer enables the poly(meth)acrylamide to be changed into a cation and has the effect of making the zeta potential of the resulting rosin emulsion particle positive at pH 4–8. Examples of the cationic monomer include (mono- or dialkyl)aminoalkyl(meth)acrylate, (mono -or di-alkyl)amino hydroxylalkyl(meth)acrylate, (mono- or di-alkyl)aminoalkyl(meth)acrylamide, (mono- or di-alkyl)aminohydroxylalkylvinylether, vinylpyridine, vinylimidazole, diatlylamine, etc. as well as quaternary ammonium salts thereof. These monomers can be used alone or in combination.

Examples of the (b-2) anionic monomer include monomers containing carboxylic acid radical such as (meth)acrylic acid, maleic acid, fumaric acid, itaconic acid, citraconic acid, crotonic acid, etc.; monomers containing sulfonic acid radical such as vinylsulfonic acid, (meth)allylsulfonic acid, 2-acrylamide-2methylpropanesulfonic acid, sulfonated styrene, etc.; and monomers containing phosphoric acid ester moiety such as phosphoric acid ester of hydroxyalkyl (meth)acrylate. These monomers can be used alone or in combination.

The (b-3) hydrophobic monomer is used to provide the polymer with hydrophobic parts and enhance the adsorbability of the polymer to the rosin particles. The use of the hydrophobic monomer in the ratio of 3–50 mol % significantly improves the emulsifiability of the rosin materials and the stability and sizing performance of the resulting emulsion, although the mechanism through which these effects are attained by the addition of a hydrophobic monomer is not clear.

Examples of the (b-3) hydrophobic monomer include alkylester of (meth)acrylic acid monomer represented by the general formula

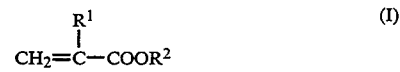

wherein $R^1$ stands for hydrogen or $CH_3$, $R^2$ stands for $C_{1-22}$ alkyl, $C_{3-22}$ alkenyl, cyclohexyl, phenyl, benzyl, glycidyl,

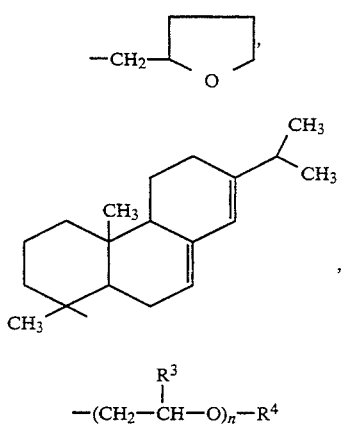

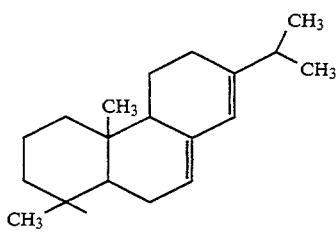

(wherein $R^3$ stands for hydrogen or $CH_3$, $R^4$ stands for hydrogen, lower alkyl, phenyl, $C_{1-20}$ alkylphenyl, $C_{7-20}$ aralkylphenyl or $-CH_2CH_2-C_8F_{17}$) or $-CH_2-CH(OH)-R^5$ (wherein $R^5$ stands for hydrogen, $CH_3$, $-CH_2OH$, $-CH_2-OOC-R^6$ (wherein $R^6$ stands for $C_{1-22}$ alkyl, $C_{3-22}$ alkenyl or

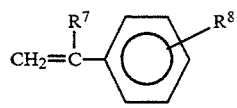

styrene monomer or a derivative thereof represented by the general formula (II):

$$CH_2=\overset{R^7}{\underset{}{C}}-\!\!\!\bigcirc\!\!\!-R^8 \qquad (II)$$

wherein $R^7$ stands for hydrogen or $CH_3$ and $R^8$ stands for hydrogen or a lower alkyl group such as $CH_3$, $-CH(CH_3)_2$, $-C(CH_3)_3$;

$C_{6-22}$ olefine, (meth)acrylonitrile, vinyl ester such as vinyl acetate, vinyl propionate and $C_{1-22}$ alkylvinylether. These monomers can be used alone or in combination of two or more.

The (b-3) monomer is preferably used in an amount of not more than 50 mol % of the total monomer. When it is used in an amount of over 50 mol %, the resulting polymer is inferior in emulsifying performance for rosin materials and accordingly the stability of the emulsion is degraded. Although the degradation of the stability can be compensated for by the use of more cationic poly(meth)acrylamide, this impairs the sizing performance.

The cationic poly(meth)acrylamide having hydrophobic groups (polymer component (B))can be synthesized by known processes. For example, the above-mentioned monomers (b-1)-(b-4) are polymerized in an organic solvent such as a lower alcohol such as methanol, ethanol, isopropyl alcohol, tert-butylalcohol, etc. acetone, methylethylketone and dioxane or a mixture of one of these organic solvents and water with the aid of a radical polymerization catalyst. The polymer is obtained by distilling off the solvent after the polymerization is finished. Radical polymerization catalysts usable in the present invention include persulfate salts such as ammonium persulfate, potassium persulfate, sodium persulfate, redox polymerization catalysts which are a combination of one of the above-mentioned persulfates and a reducing agent and also azo catalysts such as 2,2'-azo-bis-isobutyronitrile, etc. Known chain transfer agents can be used in combination With the above catalysts if desired.

The viscosity of the solution of the thus obtained polymer (B) is preferably in the range of 10-5000 cps, more preferably 50-2000 cps, as measured in a 20% aqueous solution by a Brookfield viscometer at 60 rpm and 25° C. With a viscosity outside of this range, the polymer will be inferior in-emulsifying performance for rosin materials and accordingly a greater amount of emulsifier is needed, which impairs the sizing performance or the stability of the resulting cationic emulsion sizing agent.

The preferred ratio of the cationic poly(meth)acrylamide to the rosin material is in the range of 0.5-20%, more preferably 1-15%, most preferably 3-10%, by dry weight, in consideration of the stability, sizing performance and the cost of the product. A stable product can be prepared even when the polymer is used in an amount greater than said upper limit. However, this may be disadvantageous in view of the cost and may adversely affect the sizing performance. The total solid content is preferably 20-60%, preferably 30-50%, by weight of the composition.

Cationic or nonionic surfactants may be contained in the sizing composition of the present invention.

Cationic surfactants usable in the present invention include tetraalkylammonium chloride, trialkylbenzylammonium chloride, alkylamine acetate, alkylamine hydrochloride, oxyethylenealkylamine, polyoxyehylenealkylamine. Nonionic surfactants usable in the present invention include polyoxyethylenealkylether, polyoxyethylenealkylphenylether, polyoxyethylenestyrylphenylether, ali phatic acid ester of polyoxypropylenepolyoxyethyleneglycol glycerine, aliphatic acid ester of sorbitan, aliphatic acid ester of polyethleneglycol, aliphatic acid ester of polyoxyethylenesorbitan, aliphatic acid ester of sucrose, aliphatic acid ester of pentaerythritol, aliphatic acid ester of propylene glycol and aliphatic acid diethanolamide.

For the preparation of the paper sizing composition of the present invention, any known method suitable therefor can be used. Examples of such methods are a solvent method which comprises dissolving a rosin material in a oil-soluble solvent, mixing the solution with the above-mentioned (B) component and water, homogenizing the mixture and then removing the solvent; a mechanical method which comprises melting the rosin materials, mixing the molten rosin materials with above-mentioned (B) component and water at a high temperature and under a high pressure and homogenizing the mixture; and a phase inversion method which comprises mixing the molten rosin materials with the above-mentioned (B) component and a part of the water to be used under agitation to form an water-in-oil type emulsion and then adding the rest of the water to the emulsion to convert it to a oil-in-water type emulsion.

The accumulative median particle size in the distribution of particle size based on weight in the thus obtained rosin emulsion is preferably not more than 1 μm more preferably not more than 0.5μm. When the median particle size surpasses 1 μm, precipitation tends to occur during storage and the mechanical stability may be inferior. The accumulative median particle size was measured with a Master Sizer (manufactured by Malvern Instruments Ltd.).

The thus obtained paper sizing composition exhibits an excellent storage stability even when the emulsion does not contain the above-mentioned surfactant which can be optionally added. It is inferred from this fact that the cationic poly(meth)acrylamide having hydrophobic groups, which is the main ingredient of the sizing composition of the present invention, plays an essential role in the emulsion stabilizing effect. The preparation of the composition is more facile than that of the conventional sizing composition involving the use of cationic dispersant. Since the particles of the emulsion of the present invention are finely dispersed and almost totally free from aggregation, the emulsion exhibits an excellent storage stability and an excellent mechanical stability. Furthermore, the composition exhibits a markedly improved sizing effect in comparison with conventional rosin sizing agents not only in acidic papermaking but also in neutral papermaking and causes less foaming in the papermaking system.

Thus the sizing composition of the present invention exhibits an outstanding sizing effect that cannot be attained by conventional rosin sizing agents even in the following cases:

1) papermaking system in which crude alum cannot be used or can be used only in a limited amount: e.g. neutral machine glazed paper, neutral liner, can liner, metal plate interleaving paper, etc.;
2) papermaking system where waste paper containing calcium carbonate is used as pulp source: e.g. gypsum liner board, white board, base paper to be used with coating, groundwood-pulp-containing paper, liner for general use, corrugating medium, etc.;
3) papermaking system where calcium carbonate is used as filler: e.g. neutral printing/writing paper, neutral coating base paper, neutral PPC paper, neutral information business paper, etc.; and
4) papermaking system in which the use of retention aids is restricted: e.g. kraft paper, etc.

Furthermore, the sizing composition of the present invention is superior to conventional neutral sizing agents such as alkylketene dimer and alkenylsuccinic anhydride in the sizing of high yield pulp, gives a fast size development and the composition does not cause significant contamination in papermaking devices such as the press roll and dryer canvas. The sizing composition of the present invention still exhibits an excellent sizing effect even in a papermaking system in which a larger amount of crude alum is used.

In the method of sizing of the present invention, the sizing composition of the present invention is added or applied in the paper or paperboard making process, for example, at the wet end. The composition is added to an aqueous dispersion of pulp fibers preferably in an amount of 0.005–10%, more preferably 0.05–5%, by dry weight.

The sizing composition and the sizing method of the present invention are applicable to paper made of bleached or unbleached chemical pulp such as kraft pulp and sulfite pulp; bleached or unbleached high yield pulp such as groundwood pulp, mechanical pulp and thermomechanical pulp; waste paper such as waste newspaper, waste magazine paper, waste corrugated board and deinked waste paper; or a mixture of these pulp sources and fibers such as asbestos, polyamide, polyester, polyolefin and the like.

Fillers, dyes, dry-strength agents, wet-strength agents, retention aids and drainage aids may be added if necessary for attaining properties required for specific product types. Clay, talc and ground or precipitated calcium carbonate can be used as a filler alone or in combination. Examples of dry-strength agent are anionic polyacrylamide, cationic polyacrylamide, amphoteric polyacrylamide, cationized starch, etc., which can be used alone or in combination. Examples of wet-strength agent are polyalkylenepolyamide-epichlorohydrin resin, melamine-formalin resin, urea-formalin resin, etc., which can be used alone or in combination with anionic polyacrylamide. Examples of retention aid are anionic or cationic polyacrylamide having high molecular weight, combination of silicasol and cationized starch, combination of bentonite and cationic polyacrylamide having high molecular weight, etc. Examples of drainage aid are polyethyleneimine, cationic polyacrylamide, etc. Starches, polyvinylalcohol, dyes, coating colors, surface sizing agents, antislipping agents, etc. may be applied as desired by means of a size press, gate roll coater, Billblade coater, calender, etc. Crude alum is added before, after or simultaneously with the addition of the sizing composition of the present invention.

The sizing composition of the present invention can be used as a surface sizing agent. Any known method such as spraying, dipping, applying, etc. can be employed in this case.

Now the invention will be illustrated by way of working and comparative examples. However, it should be understood that the invention is not limited to these specific embodiments. In the following examples, the terms "percentage" and "part" mean those by weight.

(1) Preparation of cationic poly(meth)acrylamide having hydrophobic groups

Poly(meth)acrylamides (A-1)–(A-5) (for working examples) and poly(meth)acrylamides (A-6)–(A-9) (for comparative examples) were prepared in the following manner.

(i)Preparation of aqueous solution of polymer (A-1)

In a 1 liter four-necked flask equipped with a stirrer, a thermometer, a reflux condenser and a nitrogen-introducing port, 31.4 parts of dimethylaminoethyl methacrylate, 85.3 parts of a 50% aqueous solution of acrylamide, 20.8 parts of styrene, 100.6 parts of deionized water, 143.3 parts of isopropyl alcohol and 0.6 part of n-dodecylmercaptan were placed. The pH of the mixture was adjusted to 4.5 with a 20% acetic acid aqueous solution. The mixture was warmed to 60° C. stirred in nitrogen a atmosphere. Then 2.3 parts of a 5% aqueous solution of ammonium persulfate were added and the temperature of the mixture was raised to 80° C. to start polymerization and the reaction was allowed to continue at the same temperature for 1.5 hours, whereafter 0.7 part of the 5% aqueous solution of ammonium persulfate was further added. After the reaction mixture was maintained at the same temperature for another hour, 100 parts of deionized water were added and the isopropyl alcohol in the mixture was removed by distillation. The polymer solution was diluted with deionized water.

The thus obtained (A-1) polymer solution contained 20.4% of solid content and the Brookfield viscosity measured at 60 rpm and 25° C. (hereinafter referred to as viscosity) of the solution was 340 cps. The composition, solid content and viscosity are summarized in Table 1.

(ii) Preparation of aqueous polymer solutions (A-2)-(A-5) (for working examples) and (A-6)-(A-9) (for comparative examples)

In the same manner as in the preparation of (A-1) polymer solution, except that the ratio of isopropyl alcohol to water was changed for the purpose of adjusting the viscosity, aqueous polymer solutions (A-2)-(A-5) (for working examples) and (A-6)-(A-9) (for comparative examples) were prepared from the monomer composition indicated in Table 1. The solid content and viscosity are also shown in Table 1.

Examples 2–3

In the same manner as in Example 1, paper sizing compositions (Examples 2–3) were prepared by using polymer solutions (A-2) and (A-3) respectively in a mixing ratio as shown in Table 2.

Examples 4–5

150 parts of the above-mentioned fortified rosin were dissolved in 150 parts of toluene and 15 parts each of solutions (A-4) and (A-5) were respectively added together with 345 parts of water to the rosin solution. The mixture was passed through an homogenizer twice under a pressure of about 150 kg/cm$^2$. Then the tolue-

TABLE 1

| Polymer solution | Composition (mol %) | | | | Properties of Polymer Solution | | |
|---|---|---|---|---|---|---|---|
| | Cationic monomer | Anionic monomer | Acrylamide (Methacrylamide) | Hydrophobic monomer | Solid content (%) | Viscosity (cps) | pH |
| A-1 | DEMA 20 | | 60 | St 20 | 20.4 | 340 | 4.2 |
| A-2 | DEMAC 10 | AA 2 | 78 | St 10 | 20.1 | 190 | 3.9 |
| A-3 | DPA 6 | | 84 | BA 10 | 20.2 | 280 | 4.3 |
| A-4 | DPMAC 15 | | 50 | IBMA 5 MMA 30 | 20.3 | 420 | 4.4 |
| A-5 | DPMA 6 | MAA 2 | 80 + (7) | IBMA 5 | 20.1 | 580 | 3.8 |
| A-6 | DEMA 6 | IA 1 | 93 | | 20.0 | 440 | 4.2 |
| A-7 | DPMA 4 | IA 2 | 39 | IBMA 55 | 20.5 | 820 | 4.0 |
| A-8 | DEMAC 40 | | | BA 60 | 20.3 | 110 | 4.1 |
| A-9 | | MAA 12 | 78 | St 10 | 20.2 | 330 | 3.7 |

DEMA: Dimethylaminoethyl methacrylate
DEMAC: DEMA quaternized with methylchloride
DPMA: Dimethylaminopropyl methacrylamide
DPMAC: DPMA quaternized with methylchloride
DPA: Dimethylaminopropyl acrylamide
MMA: Methyl methacrylate
AA: Acrylic acid
MAA: Methacrylic acid
IA: Itaconic acid
St: Styrene
IBMA: Iso-butyl methacrylate
BA: N-butyl acrylate (2) Preparation of fumaric-acid fortified rosin 70 parts of fumaric acid were slowly added to 460 parts of molten gum rosin at about 200° C. After the reaction was almost completed, 470 parts of tall oil rosin modified by formaldehyde (modification rate: 3%) were added and the molten reaction mixture was further stirred to be homogeneous and then allowed to cool to room temperature. The thus obtained reaction product was a fortified rosin which contained 7% of fumaric acid added thereto.

(3) Preparation of the paper sizing composition

Example 1

150 parts of the above-mentioned fortified rosin were melted by heating to about 150° C. and 38.9 parts of the solution (A-1) containing cationic poly(meth)acrylamide having hydrophobic groups were added under agitation. Hot water was slowly added to the thus obtained water-in-oil type emulsion to convert the emulsion into oil-in-water type. Hot water was further added quickly to stabilize the resulting oil-in-water type emulsion and the emulsion was allowed to cool to room temperature. The total amount of the hot water used for phase inversion and dilution was 121 parts. The thus obtained emulsion contained 50.5% solid content and the accumulative median particle size measured with a Master Sizer (manufactured by Malvern Instruments Ltd.) was 0.45 μm. The emulsion was stable for a long period of time.

ne, was totally removed by distillation under a reduced pressure. The obtained emulsions contained 35.2% and 36.5% of solid content respectively.

Examples 6–7

150 parts of the above-mentioned fortified rosin were melted at 170° C. and mixed with 31 parts of solutions (A-1) and (A-3), respectively, together with 200 parts of water at a high temperature and under a high pressure. The mixture was passed through a homogenizer twice under a pressure of about 150 kg/cm$^2$. Both of the obtained emulsions contained about 40% of solid content.

The zeta potential of these emulsion sizing agents was measured by diluting the sample of the each emulsion to a content ratio of 0.01% with $10^{-3}$M potassium chloride solution and adjusting the pH of the solution to 4, 7 and 8 with hydrochloric acid or caustic potash and then carrying out the measurement with a zeta potential meter (Lazer-Zee Meter manufactured by Pen Kem Inc.). All of the emulsion sizing agents of the present invention are cationic as will be understood from the zeta potentials shown in Table 2. No aggregation was observed in the emulsions of the present invention and they showed a good stability.

Comparative Examples 1–4

In the same manner as in Example 1, emulsion sizing compositions (Comparative Examples 1–4) were obtained from the mixing ratio shown in Table 2. These emulsions contained a significant amount of aggregations and the materials which were not dispersed. The accumulative median particle size in the particle size distribution based on weight was greater than 1 μm and the emulsions were inferior in storage stability.

Comparative Example 5

In this example, an anionic rosin emulsion was prepared using an anionic polymer dispersant represented by the saponified styrene-methacrylic acid copolymer described in the Japanese Laid-open Publication No. 61-108796 (corresponding to U.S. Pat. No. 4,681,909; Example 8) in accordance with the method described in Example 3 of the Publication.

250 parts of the above-mentioned fumaric-acid fortified rosin were melted by heating to about 150° C. and 135 parts of the saponified styrene-methacrylic acid copolymer described in the above-mentioned Japanese Laid-open Publication and 7 parts of 20 ammonium salt of sulfate ester of polyoxyethylene (polymerization degree:12) dodecylphenylether were added under agitation. Hot water was slowly added to the thus obtained water-in-oil type emulsion to convert the emulsion into oil-in-water type. Hot water was further added quickly to stabilize the resulting oil-in-water type emulsion and the emulsion was allowed to cool to room temperature. The total amount of the hot water used for phase inversion and dilution was 211 parts. The thus obtained emulsion contained 45% of solid content. About 0.5% of the solid content was the above-mentioned anionic surfactant and about 7.5% of the solid content was the saponified styrene-methacrylic acid copolymer. The emulsion remained stable for prolonged time.

Comparative Example 6

In this example, a rosin emulsion was prepared in according to the method described Example 1 of U.S. Pat. No. 3,966,654.

300 parks of the above-mentioned fortified rosin were dissolved in 300 parts of benzene and 400 parts of the polyaminopolyamide-epichlorohydrin resin solution (solid content: 50 parts) prepared in accordance with the method described in Referential Example 17 of the above-mentioned U.S. patent were added together with 350 parts of water to the rosin solution. The mixture was passed through a homogenizer twice under a pressure of about 150 kg/cm$^2$. Then the benzene was totally removed by distillation under a reduced pressure. The obtained emulsions contained about 35% of solid content. About 85% of the solid content was the fortified rosin and about 15% of the solid content was the polyaminopolyamide-epichlorohydrin resin.

Comparative Example 7

In this example, a rosin emulsion was prepared in accordance with the method described in Example 1 of the Japanese Laid-open Publication No. 63-120198.

225 parts of the above-mentioned fortified rosin were melted at 150° C. and mixed with 200 parts of the quaternized cationic copolymer of dimethylaminoethyl methacrylate and t-butyl methacrylate (solid content: 50 parts) aqueous solution under agitation. Hot water was slowly added to the thus obtained water-in-oil type emulsion to convert the emulsion into oil-in-water type at 95° C. Hot water was further added to adjust the solid content to 40% and to stabilize the resulting oil-in-water type emulsion and the emulsion was allow to cool to room temperature.

The composition and the properties of the sizing agents of the above-mentioned working and comparative examples are summarized in Table 2.

TABLE 2

| | Properties of Paper Sizing Compositions | | | | |
|---|---|---|---|---|---|
| | Cationic poly(meth)acrylamide having hydrophobic groups | | Paper sizing composition | | |
| | Designation | Solid content[1] (wt %) | Particle size[2] (μm) | ζ potential[3] (mV) | Solid content (%) |
| Working Ex. 1 | A-1 | 5 | 0.45 | +29 | 50.5 |
| Ex. 2 | A-2 | 7.5 | 0.39 | +33 | 50.2 |
| Ex. 3 | A-3 | 10 | 0.30 | +39 | 45.1 |
| Ex. 4 | A-4 | 2 | 0.50 | +22 | 35.2 |
| Ex. 5 | A-5 | 2 | 0.53 | +21 | 36.5 |
| Ex. 6 | A-1 | 4 | 0.30 | +28 | 39.7 |
| Ex. 7 | A-3 | 4 | 0.29 | +24 | 40.5 |
| Comp. Ex. 1 | A-6 | 10 | 1.52 | +29 | 50.0 |
| Ex. 2 | A-7 | 10 | 5.70 | +30 | 49.0 |
| Ex. 3 | A-8 | 10 | 6.53 | +25 | 48.6 |
| Ex. 4 | A-9 | 10 | 2.59 | −20 | 49.5 |
| Ex. 5 | — | — | 0.30 | −65 | 45.3 |
| Ex. 6 | U.S. Pat. No. 3966654 Ex. 1 | | 0.98 | +30 | 35.2 |
| Ex. 7 | JP-A 63-120198 Ex. 1 (U.S. Pat. No. 4,943,608 Ex. 1) | | 0.43 | +19 | 40.5 |

[1]Solid content based on total solids of sizing composition
[2]Accumulative-median particle size of particle size distribution based on weight
[3]Observed at pH 7

The sizing compositions prepared in the above-mentioned examples were tested in the following manner.

The amount of the agents used in the following tests are solid content ratio to the dry weight of the pulp.

(1) Sizing Test

Condition 1

Bleached kraft pulp (mixture of soft wood pulp and hard wood pulp in the ratio of 1:4) was beaten to a pulp slurry having a 2.5% consistency and Canadian standard freeness 350 ml by a beater with water having 100 ppm of hardness. 1.2 liter of the pulp slurry was placed in the breaker and 0.5% of the sizing agent and 0.25% of crude alum were simultaneously added thereto, whereafter the pH was adjusted to 7 with caustic soda. After the mixture had been stirred for 30 minutes, the pulp slurry was diluted to 0.25% and 0.05% of a cationic polyacrylamide retention aid ("Epinox DS 510" marketed by DIC-Hercules Chemicals, Inc.) was added. From the thus prepared paper stock, test paper having a basis weight of 65 g/m² was made by a Noble and Wood papermachine. The wet test paper was dried at 100° C. for 60 seconds by a drum dryer. After the paper had been conditioned in an atmosphere of 20° C. and 60% RH for 24 hours the sizing degree was measured by the Stöckigt method.

The conditions of this sizing effect test correspond to those of a papermaking system in which crude alum should be limited, more specifically to the conditions necessary for making neutral machine glazed and metal plate interleaving paper.

Condition 2

1.2 liter of the pulp slurry prepared in the same manner as in Condition 1 was placed in a breaker and 0.6% of the sizing agent, 1.0% of crude alum and 0.2% of the above-mentioned DS 510 dry-strength/retention aid were added. After the mixture had been stirred for 10 minutes, the pulp slurry was diluted to 0.25% with water of pH 8 and 5% of precipitated calcium carbonate ("Tamapearl 121S" marketed by Okutama Industry Co., Ltd.), whereafter 0.01% of a cationic polyacrylamide retention aid ("Hi Reten 104" marketed by DIC-Hercules Chemicals, Inc.) was added thereto. From the thus prepared paper stock, test paper having a basis weight of 65 g/m² was made by a Noble and Wood papermachine. The wet test paper was dried at 100° C. for 60 seconds by a drum dryer. After the paper had been conditioned in a 20° C. 60% RH atmosphere for 24 hours, the sizing degree was measured by the Stöckigt method.

The conditions of this sizing effect test correspond to those of a papermaking system in which calcium carbonate is used as filler, more specifically to the condition necessary for making neutral printing/writing paper, neutral coating base paper, neutral PPC paper and neutral information business paper.

Condition 3

Waste corrugated board was beaten by a beater to a 2.5% consistency pulp slurry having Canadian standard freeness 400 ml using water having 100 ppm of hardness.

1.2 liter of the pulp Slurry was placed in a breaker and 0.3% of the sizing agent was added. After the mixture had been stirred for 10 minutes, the pulp slurry was diluted to 0.25% and 0.05% of the above-mentioned DS 510 was added. From the thus prepared paper stock, test paper having a basis weight of 100 g/m² was made by a Noble and Wood papermachine. The wet test paper was dried at 100° C. for 80 seconds by a drum dryer. After the paper had been conditioned in a 20° C., 60% RH atmosphere for 24 hours the sizing degree was measured by the one-minute Cobb method.

The conditions of this sizing effect test correspond to those of a papermaking system in which crude alum cannot be used, more specifically to the conditions necessary for making neutral liner and can liner.

Condition 4

A mixture of waste coated paper and bleached hard wood pulp in a mixing ratio of 2:8 was beaten by a beater to a 2.5% consistency pulp slurry having Canadian standard freeness 350 ml using water having 100 ppm of hardness. The calcium carbonate content of the pulp slurry was 6% based on the pulp.

1.2 liter of the pulp slurry was placed in a breaker and 1.0% of crude alum was added thereto. After the mixture had been stirred for 1 minute, the pulp slurry was diluted to 0.25% and 0.5% of the sizing agent and 0.05% of the above-mentioned DS 510 was added thereto. From the thus prepared paper stock, test paper having a basis weight of 80 g/m² was made by a Noble and Wood papermachine. The wet test paper was dried at 100° C. for 70 seconds by a drum dryer. After the paper had been conditioned in a 20° C. and 60% RH atmosphere for 24 hours the sizing degree was measured by the one-minute Cobb method.

The conditions of this sizing effect test correspond to those of a papermaking system where waste paper containing calcium carbonate is used as pulp source, more specifically to the condition necessary for making gypsum liner board and white board.

The results of the above-mentioned sizing tests are summarized in Tables 3 and 4.

TABLE 3

| Sizing Effect of Paper Sizing Compositions | | |
|---|---|---|
| | Stöckigt Sizing Degree (sec) | |
| | Condition 1 | Condition 2 |
| Example 1 | 29 | 23 |
| Example 2 | 33 | 26 |
| Example 3 | 29 | 22 |
| Example 4 | 32 | 24 |
| Example 5 | 30 | 28 |
| Example 6 | 30 | 29 |
| Example 7 | 26 | 24 |
| Comp. Ex. 1 | 10 | 11 |
| Comp. Ex. 2 | 5 | 6 |
| Comp. Ex. 3 | 9 | 6 |
| Comp. Ex. 4 | 4 | 4 |
| Comp. Ex. 5 | 1 | 4 |
| Comp. Ex. 6 | 16 | 12 |
| Comp. Ex. 7 | 20 | 10 |

*NOTE:
In this test, larger values indicate better sizing.

TABLE 4

| Sizing Effect of Paper Sizing Compositions | | |
|---|---|---|
| | Cobb size (g · H₂O/m²) | |
| | Condition 3 | Condition 4 |
| Example 1 | 68 | 22 |
| Example 2 | 71 | 22 |
| Example 3 | 60 | 22 |
| Example 4 | 65 | 24 |
| Example 5 | 64 | 23 |
| Example 6 | 64 | 22 |
| Example 7 | 66 | 25 |
| Comp. Ex. 1 | 95 | 68 |
| Comp. Ex. 2 | 98 | 71 |
| Comp. Ex. 3 | 108 | 75 |
| Comp. Ex. 4 | 122 | 70 |
| Comp. Ex. 5 | 132 | 83 |
| Comp. Ex. 6 | 85 | 48 |
| Comp. Ex. 7 | 91 | 51 |

*NOTE:
In this test, smaller values indicate better sizing.

(2) Foaming Test 0.5% of the sizing agent and 0.25% of crude alum were simultaneously added to the pulp slurry prepared as in the above-mentioned Sizing Effect Test 1 and the pH was adjusted to 7 with caustic soda. After the mixture had been stirred for 3 minutes, the pulp slurry was diluted to 0.25% and 0.05% of DS 510 was added thereto. The mixture was further stirred for 1 minute and placed in a cylindrical container. Part of the slurry was pumped up and dropped into the container from a height of about 1 meter. The foaming area (area where foam accumulated) was measured after 10 minutes. The ratio of the foaming area with regard to the total surface area is shown in percent in Table 5.

(4) Storage Stability Test

Sample (100 ml) of the above-mentioned sizing agents were respectively placed in a test tube (length: 30 cm; diameter: 2.1 cm). After the samples had been stored for 1 month, the thickness (mm) of the deposit on the bottom was measured. The results are summarized in Table 5.

TABLE 5

Storage Stability and Foaming Properties of the Paper Sizing Compositions

| | Storage Stability (mm) | Foaming Properties (%) |
| --- | --- | --- |
| Example 1 | <1 | 20 |
| Example 2 | <1 | 30 |
| Example 3 | <1 | 30 |
| Example 4 | <1 | 30 |
| Example 5 | <1 | 20 |
| Example 6 | <1 | 20 |
| Example 7 | <1 | 40 |
| Comp. Ex. 1 | 8 | 50 |
| Comp. Ex. 2 | 15 | 70 |
| Comp. Ex. 3 | 19 | 70 |
| Comp. Ex. 4 | 17 | 80 |
| Comp. Ex. 5 | <1 | 90 |
| Comp. Ex. 6 | 8 | 90 |
| Comp. Ex. 7 | <1 | 60 |

We claim:

1. A paper sizing emulsion composition which comprises (A) at least one rosin material and (B) a cationic acrylamide copolymer containing 50–95 mol % of monomeric units selected from the group consisting of acrylamide and methacrylamide, 3–50 mol % of at least one hydrophobic monomer selected from the group consisting of alkyl esters of methacrylic acid, alkyl esters of acrylic acid, styrene or a derivative thereof, $C_6$–$C_{22}$ olefin, acrylonitrile, methacrylonitrile, vinyl ester and $C_1$–$C_{22}$ alkylvinyl ether and 2–30 mol % of cationic monomer selected from the group consisting of (mono- or dialkyl) aminoalkyl acrylate or methacrylate, (mono- or di-alkyl) aminoalkyl acrylamide or methacrylamide, vinylimidazole, diallylamine, (mono- or di-alkyl)amino-hydroxylalkyl acrylate or methacrylate, (mono- or dialkyl) aminohydroxyalkylvinylether, vinyl-pyridine and quaternized salts thereof, wherein said rosin material is directly dispersed in water and stabilized with said copolymer.

2. The composition of claim 1, wherein the particles of emulsion have positive zeta potential at a pH of 4–8 and accumulative median value in the particle size distribution based on weight of not more than 1 μm.

3. The composition of claim 1 or 2, wherein the component (B) is a copolymer prepared from monomers in the following content:
   (b-1) cationic monomer 2–30 mol %
   (b-2) anionic monomer not more than 5 mol %
   (b-3) hydrophobic monomer 3–50 mol %
   (b-4) acrylamide non-ionic; and methacrylamide and mixtures thereof
   50–95 mol %

4. The composition of claim 3, wherein (b-2) content if 0 mol %.

5. The composition of claim 3, wherein the content of the component (B) is 0.5–20% by weight based on the total solid content of the composition.

6. The composition of claim 4, wherein the content of the component (B) is 0.5–20% by weight based on the total solids content of the composition.

7. The composition of claim 1, wherein the content of the component (B) is 0.5–20% by weight based on the total solid content of the composition.

8. The composition of claim 2, wherein the content of the component (B) is 0.5–20% by weight based on the total solids of the composition.

9. The composition of claim 1, the total solids content is 20–60% by weight based on the whole composition.

* * * * *